(12) United States Patent
Matefi et al.

(10) Patent No.: US 7,660,242 B2
(45) Date of Patent: Feb. 9, 2010

(54) CALL ADMISSION CONTROL SYSTEM AND METHOD FOR INTERPRETING SIGNALING MESSAGES AND CONTROLLING TRAFFIC LOAD IN INTERNET PROTOCOL DIFFERENTIATED SERVICES NETWORKS

(75) Inventors: Gergely Matefi, Budapest (HU); Csaba Antal, Kiskunlachaza (HU); Janos Farkas, Kecskemet (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 702 days.

(21) Appl. No.: 10/595,092

(22) PCT Filed: Jul. 27, 2004

(86) PCT No.: PCT/SE2004/001152

§ 371 (c)(1),
(2), (4) Date: Feb. 8, 2006

(87) PCT Pub. No.: WO2005/022851

PCT Pub. Date: Mar. 10, 2005

(65) Prior Publication Data

US 2006/0198304 A1  Sep. 7, 2006

(30) Foreign Application Priority Data

Aug. 28, 2003 (SE) .................................. 0302321

(51) Int. Cl.
*G08C 15/00* (2006.01)
(52) U.S. Cl. .................. 370/230; 370/232; 370/235
(58) Field of Classification Search ................ 370/229, 370/230, 231, 232, 233, 235, 236
See application file for complete search history.

(56) References Cited

U.S. PATENT DOCUMENTS

| 6,567,416 B1 * | 5/2003 | Chuah .................. 370/418 |
| 7,400,630 B1 * | 7/2008 | Ji et al. ............... 370/395.21 |
| 2003/0161284 A1 * | 8/2003 | Chen .................. 370/331 |

FOREIGN PATENT DOCUMENTS

| WO | WO 0219055 A2 | 3/2002 |
| WO | WO 02089427 A1 | 11/2002 |

OTHER PUBLICATIONS

Swedish Patent Office, International Search Report for PCT/SE2004/001152, dated Nov. 2, 2004.

* cited by examiner

*Primary Examiner*—Chi H Pham
*Assistant Examiner*—Weibin Huang
(74) *Attorney, Agent, or Firm*—Roger S. Burleigh

(57) ABSTRACT

A call admission control system and method for Internet Protocol (IP) Differentiated Services (DiffServ) network having at least one node for interpreting signaling messages and controlling traffic load in the network. The method consists of an initialization (601) and a real-time phase (602). In initialization phase (601), coefficients of the approximating hyperplanes are computed (61) and stored (62). This phase is repeated when the descriptor of a traffic class changes (63), which usually happens when nodes are configured or reconfigured. A traffic mix is admissible (67), if for each real-time traffic class both the stability (65) and the delay (66) constraints are fulfilled. Stability is tested by evaluating the number of lost packets and comparing it to the tolerated packet loss ratio for each class in that queue. Delay constraint is tested by checking if the traffic mix is below at least one of the approximating hyperplanes in the space of number of sessions for each class.

8 Claims, 7 Drawing Sheets

CALL ADMISSION CONTROL SYSTEM AND METHOD FOR INTERPRETING SIGNALING MESSAGES AND CONTROLLING TRAFFIC LOAD IN INTERNET PROTOCOL DIFFERENTIATED SERVICES NETWORKS

BACKGROUND OF THE INVENTION

1. Technical Field of the Invention

The present invention relates to a call admission control (CAC) system and method for Internet Protocol (IP) Differentiated Services (DiffServ) network having at least one node for interpreting signaling messages and controlling traffic load in the network. In particular, and not by way of limitation, the present invention is directed to a system and method for interpreting signaling messages and controlling traffic load in IP network of Universal Mobile Telecommunication System Terrestrial Radio Access Networks (UTRAN) using only functionalities implemented in the IP network layer and the underlying layers.

2. Description of Related Art

IP networks were designed originally for best effort (BE) data services. Recently, there has been increasing demand to use IP networks for transmitting real-time traffic like voice, multimedia, or other delay-sensitive and jitter-sensitive traffic types. There are also plans to use IP in UTRAN as a transport protocol in mobile access networks, where, due to the mobility of the users, there are strict delay requirements and other Quality-of-Service (QoS) requirements for all traffic types. In IP UTRAN, real-time applications generate a large portion of the traffic. Thus, providing QoS guarantees (delay and loss) to real-time traffic is one of the most important requirements. As overload—either call level or packet level—in the system results in too large delay for most of the packets, it is essential to include functions that prevent overload situations. To protect against call level overload, therefore, the CAC algorithm is crucial.

DiffServ in IP-UTRAN

The current Third Generation Partnership Program (3GPP) agreements define the requirements against the IP UTRAN Transport Network Layer (TNL), but do not specify the way the TNL actually implements QoS. The QoS differentiation provided by the TNL can be based either on hop-by-hop or on end-to-end basis, and the TNL may support either flow-per-flow or aggregate classification. The necessary information for QoS differentiation among UTRAN flows is provided by the Radio Network Layer (RNL).

The transport network should be able to handle both UTRAN traffic and non-UTRAN traffic. Thus, existing QoS IP solutions should be used in the QoS architecture of the transport network. Due to scalability reasons, the DiffServ (DS) concept is preferred, nevertheless the IP UTRAN concept and the DiffServ concept differ in some important points.

The DiffServ architecture was originally designed for Internet backbones, which implies that several network providers own and operate it. The DS network, therefore, is divided into domains. At the boundaries of DS domains, traffic is regulated to allow e.g. charging and the operation of the internal of the domain. The parameters of services that a domain offers are described in the Service Level Specification (SLS), which includes a Traffic Conditioning Specification (TCS), which specifies how traffic conditioners should be configured.

The most frequently mentioned design goal of DiffServ is scalability. The large functional difference between (complex) boundary and (simple) interior nodes is due to this criterion. Traffic conditioning is one of the roles of boundary nodes, which is to measure the incoming flows and to ensure that they conform to the SLS/TCS. Boundary nodes are also responsible for marking/re-marking of incoming packets according to the Per Hop Behavior (PHB) that the flow requires inside the DiffServ domain. In contrast to this, interior nodes are typically not required to do traffic conditioning. Their task is to forward packets according to the required PHB signaled in the DS field of the IP header. Note that a PHB describes a special type of requirements demanded by flows, but it does not say anything about the exact mechanisms (such as scheduling method, buffer management, or policing method) that the router should include. It is up to the router designer how the router supports a specific PHB.

According to the DiffServ concept, neither boundary nodes nor interior nodes support CAC. If the traffic at a given ingress node i.e. the boundary node where the traffic enters the DiffServ domain exceeds the volume set in the SLS/TCS, then packets are dropped due to policing. However, policing is applied to the aggregate traffic, thus it degrades the performance of many real-time applications, as opposed to CAC, where the integrity of admitted connections is always preserved. Having recognized this fact, several solutions evolved proposing a session level control plane to the aggregate user plane of DiffServ and also proposing integration of Integrated Services (IntServ) and DiffServ networks.

RFC 2998 proposes a framework for supporting IntServ over DiffServ networks. According to the RFC, the IntServ capable part of the network includes RSVP-aware nodes, which inherently include per-session states in the forwarding and signaling planes. Edge nodes, which are at the edge of the IntServ capable part of the network, do call admission control on behalf of the DiffServ region, which does not maintain per-session states. Thus, DiffServ regions of the network are treated as virtual links connecting IntServ capable routers or hosts from the perspective of IntServ.

A next step in the evolution of DiffServ networks is when interior nodes also support a resource reservation signaling protocol, such as Resource Management in DiffServ (RMD). These solutions keep the user plane of DiffServ routers, which does not have per-flow separation, and add resource reservation to that.

Static Provisioning in DiffServ

In the current DiffServ architecture, no resource reservation signaling protocol is implemented within a DS domain. That is, interior nodes do not register ongoing connections and do not implement any admission control functionality. Furthermore, boundary nodes do not get any feedback about congestion in interior nodes.

To avoid overload, the bandwidth allocation inside the DS domain is static. Bandwidth allocation is typically implemented by two functions in DS routers, such as scheduling and policing. Scheduling, specifically weighted fair queuing (FQ), is a means for allocating a minimum guaranteed bandwidth for a given DS class. Policing, on the other hand, guarantees that the maximal bandwidth used by a given class is also limited.

Regarding dimensioning and admission control, a trunk reservation model can be used. A trunk is a virtual capacity allocated for flows with the same ingress (boundary node where traffic enters the DS domain) and egress (boundary node where traffic leaves the DS domain) nodes. Ingress nodes have to ensure—via admission control—that the aggregate (effective) bandwidth of flows in a trunk does not exceed the assigned trunk capacity. In other words, if the aggregate bandwidth of flows with the same ingress-egress boundary node—including the new request—would exceed the capacity of the corresponding trunk then the new request must be blocked. Once the ingress node admits a connection, other nodes in the domain cannot block it.

The following table summarizes the functions used in a statically provisioned network.

| Function | Static provisioning |
|---|---|
| INTERIOR NODES | |
| Bandwidth allocation to DS classes | Static |
| Configuration of traffic conditioners | Static |
| Resource reservation protocol | No |
| Admission control | No |
| BOUNDARY NODES | |
| Admission control | Yes |
| Resource reservation protocol | Yes |
| Configuration of traffic conditioners | Static |

The trunk reservation idea can be extended to IP UTRAN systems where flows have strict delay requirements and there are multiple traffic classes. Two solutions can be applied in this context, which are as follows.

Multiple Single-Class Trunks

To construct a trunk reservation model in DiffServ, an apparent solution is to completely separate the handling of DiffServ classes in the admission control. That is, between an ingress-egress pair each QoS class has separated trunks. This solution is inline with the DiffServ concept, as it requires static bandwidth allocation for QoS classes in all nodes, including interior and boundary nodes (routers).

Single Multi-Class Trunk for Each Ingress-Egress Pair

The previous static provisioning method completely separates the resource reservation of flows having the same ingress-egress node but different DS class. By allowing statistical multiplexing between all flows within an ingress-egress pair, significant capacity gain can be achieved. This can be done by allocating a multi-class trunk between each ingress-egress pair of boundary nodes, as shows, instead of several single-class trunks as in the previous method.

Statistical QoS requirements of UTRAN traffic may be violated due to overload and due to short time-scale bursts in a normal (non-overloaded) situation. Classical CAC methods consider only overload caused by the on-off behavior of sources, but they do not protect against unacceptably long waiting times due to short time-scale bursts.

Resource allocation problem in UTRAN with ATM as transport network was investigated in Sz. Malomsoky, S. Rácz and Sz. Nádas, "Connection Admission Control in UMTS Radio Access Networks," Computer Communications—Computer Communications 26 (2003) p. 2011-2023. This model was similar to the trunk model of IP UTRAN. However, they did not consider any QoS differentiation, that is, traffic was served in a common FIFO-queue. Based on analytic results, they presented a simple Call Admission Control method, which considers statistical delay requirements of UTRAN traffic.

This CAC method can be directly applied for IP UTRAN in case of single-class trunks, if large IP packets are segmented to sufficiently small segments. The main idea of this solution is to handle each DiffServ class separately. Separation means that the actual load of other QoS classes is not used in the call admission control. That is, regarding the load of other classes a worst case assumption has to be applied, i.e. they are assumed to be overloaded. When other classes are overloaded, the studied class can be handled as if it was a stand-alone FIFO system of which capacity is equal to the allocated bandwidth.

The waiting times in a DS queue in case of multi-class trunks are hard to determine analytically. However, a basic CAC approach can be presented that is based on the worst-case value of the service rate of each queue, which allows us to model each real-time queue as a separated FIFO-system in the network node. Under this assumption (referred as Separated FIFO model), CAC method for FIFO systems can be applied for multi-class trunks.

Thus, although the above-mentioned methods are suitable for reducing bandwidth capacity needs, each of them has disadvantages that limit their applicability. It would be desirable to have a method for IP networks that achieves a better utilization of the admissible region of the IP network in an efficient manner. Such a method would use only functionalities implemented in the IP network layer and the underlying layers, and would utilize an algorithm that is simple and fast. The method would not require high processing capacity, and it would be easy to implement. The present invention provides such a method.

SUMMARY OF THE INVENTION

In one aspect, the present invention is directed to a method for IP DiffServ networks having at least one node for interpreting signaling messages and controlling traffic load in the network. The method consists of an initialization and a real-time phase. In initialization phase, coefficients of the approximating hyperplanes are computed and stored. This phase is repeated when the descriptor of a traffic class changes, which usually happens when a node is configured or reconfigured. In the real-time phase a traffic mix is admissible, if for each real-time traffic class both the stability and the delay constraints are fulfilled.

In another aspect, the present invention is directed to a system for IP DiffServ networks having at least one node for interpreting signaling messages and controlling traffic load in the network. The system includes functions for computing coefficients of approximation hyperplanes, storing the coefficients of approximating hyperplanes, determining whether descriptor of a traffic class changed, determining whether an admission request is accepted, estimating the loss ratio and comparing the minimal allowed tolerance level in the queue; comparing the scalar product of the traffic mix vector and the normal vector of the hyperplane to the array of the effective bandwidth value, admitting traffic mix if for each real-time traffic class both the stability and the delay constraints are fulfilled.

Yet another aspect of the invention is a node having means implementing the functions mentioned above.

The CAC method described above makes possible to utilize statistical multiplexing gain in multi-class trunks in a static provisioned IP-UTRAN network. This leads to the advantage that the effective bandwidth need of a traffic mix transferred in a multi-class link will be lower than the sum of effective bandwidth needs of single-class links used for transferring the same traffic mix (packet level gain). Another advantage of the present invention is that a DS class could use more bandwidth than allocated when other classes are under-utilized (call level gain).

BRIEF DESCRIPTION OF THE DRAWINGS

For a more complete understanding of the prior art and the invention, reference is made to the following detailed description taken in conjunction with the accompanying drawings wherein.

DETAILED DESCRIPTION OF THE INVENTION

Figure 1:
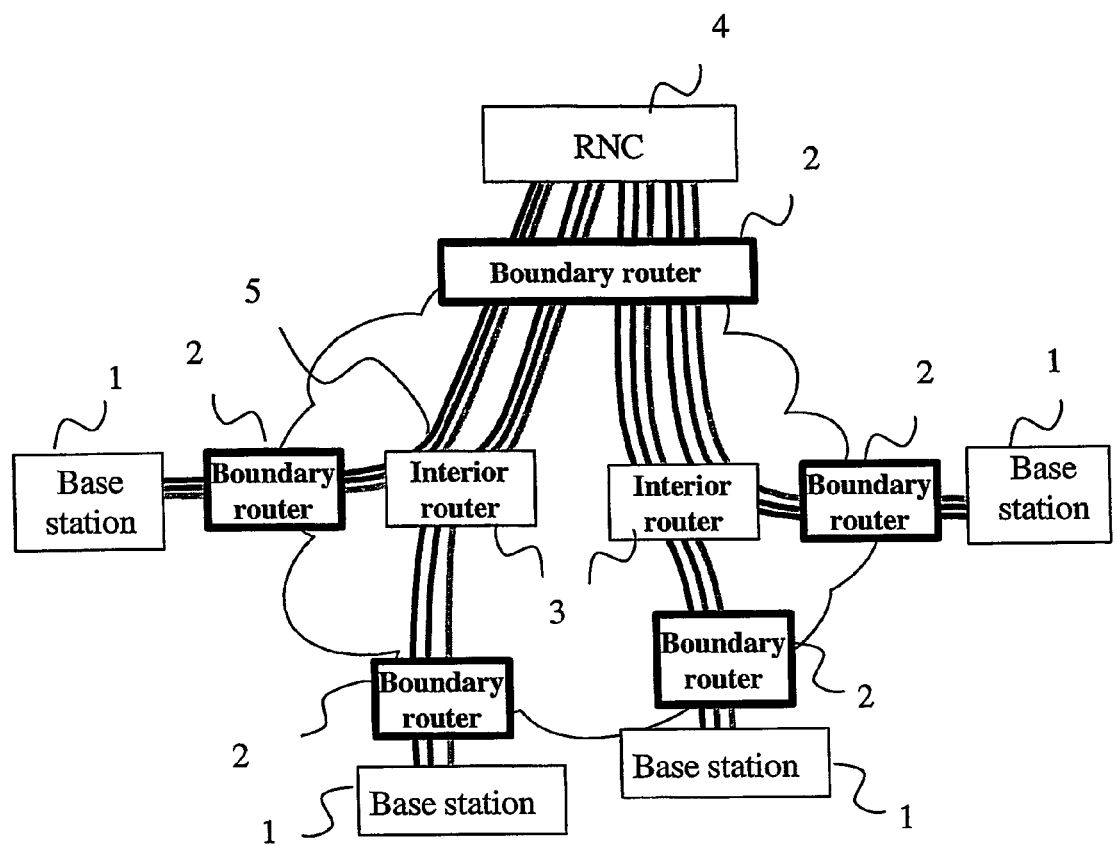
FIG. 1 is an exemplary simplified block diagram of the architecture of a per DS class trunk reservation in IP UTRAN according to the prior art.

FIG. 1 is an exemplary simplified block diagram of the architecture of IP UTRAN that includes a system with four base stations 1, five boundary routers 2, two interior routers 3, an RNC 4 and four multiple single-class trunks 5. There are three DS classes forming the trunks 5 indicated by solid lines, and thus trunks 5 originate from each boundary router 2 that is connected to a base station 1.

Figure 2:
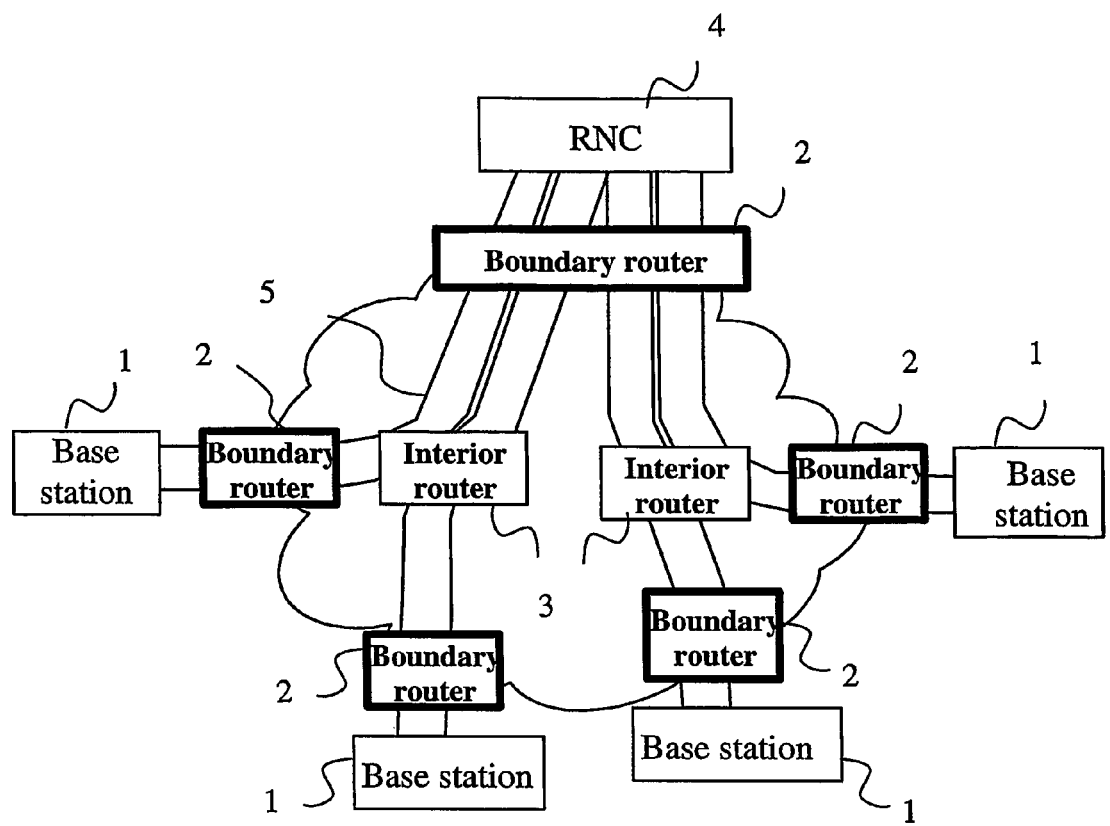
FIG. 2 is an exemplary simplified block diagram of the architecture of a single multi-class trunk per ingress-egress pair in IP UTRAN according to the prior art.

FIG. 2 is an exemplary simplified block diagram of IP UTRAN showing the same architecture of base stations 1, boundary routers 2, interior routers 3 and RNC 4. Unlike FIG. 1, four single multi-class trunks 5 are applied for each ingress-egress pair. The capacity allocations for QoS classes are static within a multi-class trunk 5. This can be ensured by any class based scheduling method in the boundary routers 2, such as class based weighted fair queuing. Opposite to the previous method, unused bandwidth of a DS class can be used by other classes. The capacity gain comes from two reasons. Firstly, the effective bandwidth need of a traffic mix transferred in a multi-class trunk will be lower than the sum of effective bandwidth needs of single-class trunk used for transferring the same traffic mix (packet level gain). Secondly, a DS class could use more bandwidth than allocated when other classes are under-utilized (call level gain).

Figure 3:
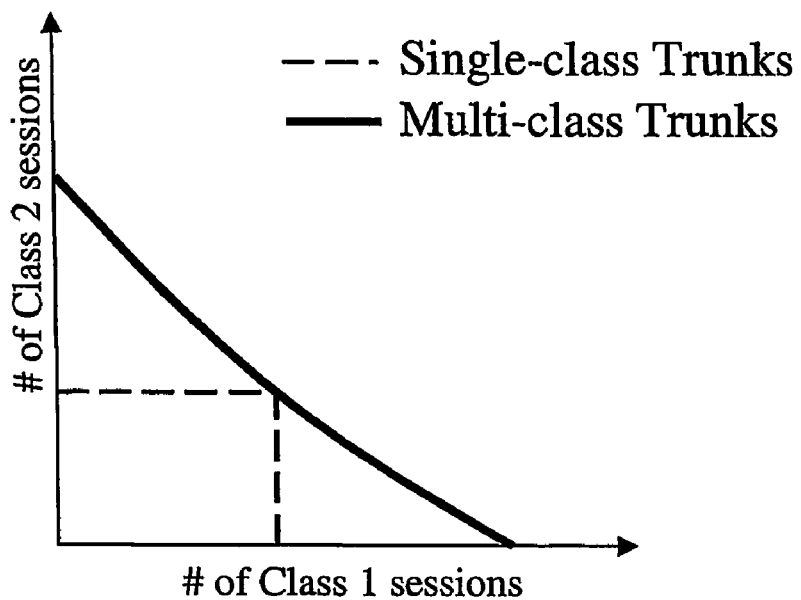
FIG. 3-4 are graphs showing admissible region of an ingress-egress trunk with DS class separation and without separation.
Figure 4:
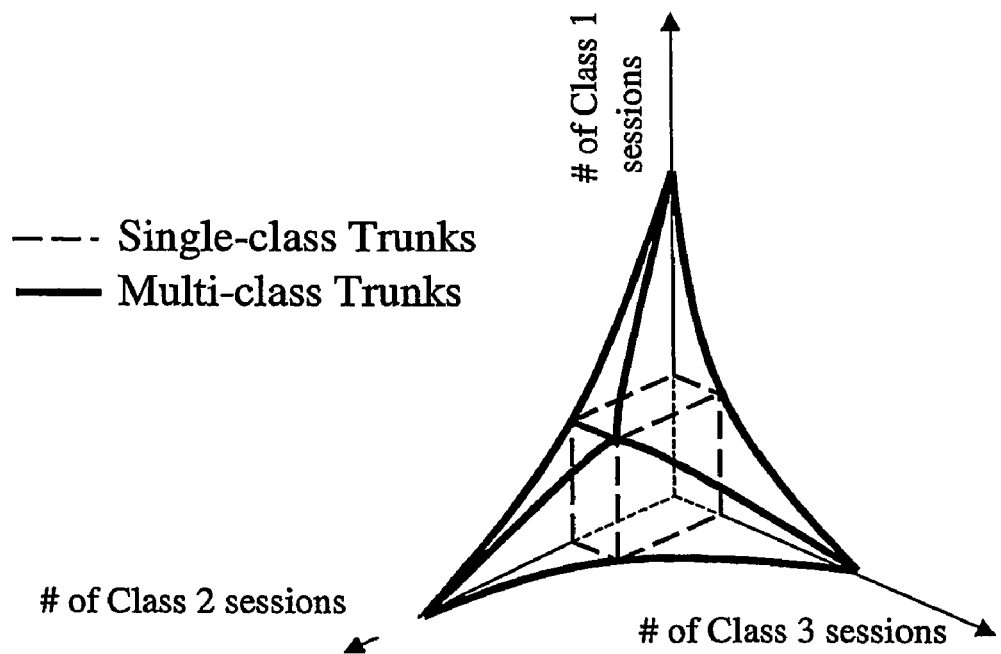

FIGS. 3 and 4 show the admissible region of an ingress-egress trunk with and without DS class separation. In case of multi-class trunks, bandwidth not used by a queue is redistributed among the others. Thus, service rate of a queue may be substantially higher than its guaranteed minimum rate, hence the Separated FIFO model may result too pessimistic approximation for the queuing delay. This is the typical case if multiple real-time classes are present in the system.

The admissible region of a multi-class trunk with two QoS classes and another one with three QoS classes is shown in the Figures where bold lines indicate the maximal available admissible region while dashed lines show the admissible region in case of FIFO-approximation. It can be seen that there is a large difference in the admissible regions.

Figure 5:
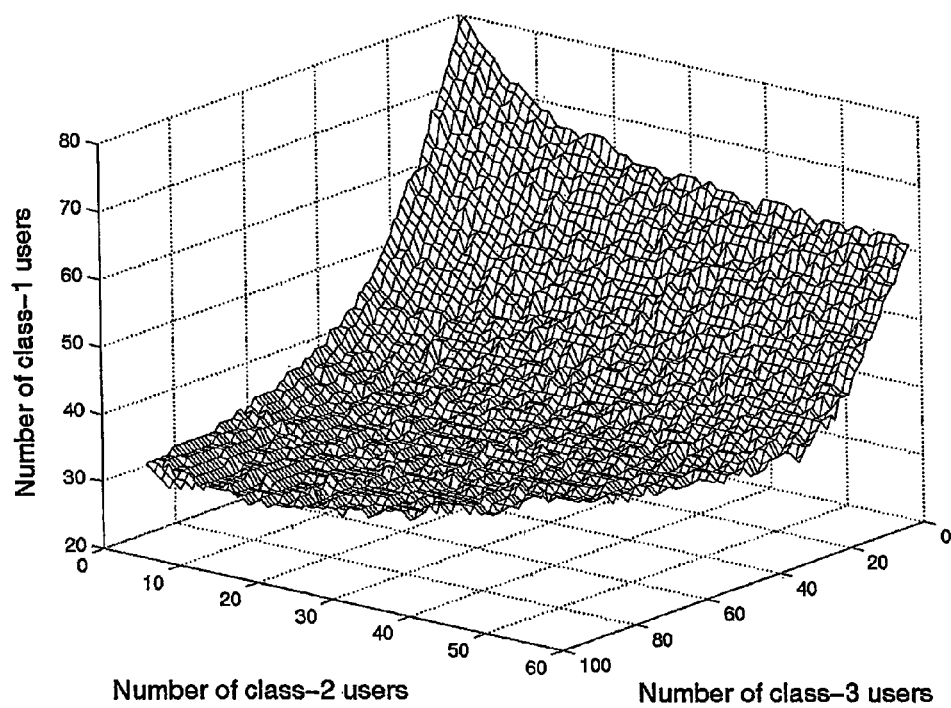
FIG. 5 is a graph showing simulative results for delay constraint surface.

FIG. 5 is a graph showing simulative results for delay constraint surface. In order to give a better approximation of the service-rate of a real-time queue than the Separated FIFO model, bandwidth redistribution among DS queues should be considered. Therefore, a set of scheduling models is constructed where the approximation of the service rate is better, but still conservative, thus the queuing delay in the models are an upper bound for the queuing delay in the original FQ system.

The delay constraint surface of a given class i is defined as the maximal number of class i sessions with respect to their delay requirements in function of number of sessions in other classes. The scheduling models provide a conservative approximation for the delay constraint surfaces. The Figure shows the delay constraint surface of a given class in a three-class FQ system, which is obtained by simulations. Each class has its own queue in the scheduler in this case. It can be observed that the surface is non-linear and decreasing. It reaches its maximum when all classes but the observed one has no sessions. Furthermore, it never falls below a certain level even if other classes generate high load. The absolute minimum level corresponds to the number of admissible connections given by the Separated FIFO model. In other words, the Separated FIFO model approximates the delay constraint surface with a horizontal plane that is fitted to its minimum value.

Before introducing the models, the service-rates in the original FQ system is analyzed if a traffic mix is given. Depending on the traffic mix, some of the queues may be saturated, that is, they are continuously utilizing their service rates. Other queues, i.e. the non-saturated queues, are empty in a part of the time and utilize their services rates only in the busy periods. Notations $S$ and $S^C$ are used for the set of non-saturated and saturated queues, respectively. The service rate of a non-saturated queue i is observed. Firstly, the case should be considered where each non-saturated queue but i is empty. In this case, link rate is shared among saturated queues and queue i, according to their weights. Thus, service rate of queue i is $$\frac{w_i}{w_i + \sum_{j \in S^c} w_j} C.$$

When a busy period in a non-saturated queue k begins, e.g. a packet arrives in queue k, then the system ensures service rate to queue k by reducing service rates of other queues, according to their weights. Thus, $$\frac{w_i}{w_i + \sum_{j \in S^c} w_j}$$

share of the service rate of queue k comes from queue i. If busy periods in additional non-saturated queues begin, then the system also ensures their service rates by further reducing the service rates of other queues. Therefore, service rate of queue i varies in time between $$\frac{w_i}{w_i + \sum_{j \in S^c} w_j} C$$

and $$\frac{w_i}{w_i + \sum_j w_j} C$$

depending on the arrival process in non-saturated queues.

To construct a scheduling model which provides a conservative approximation of service rate process of queue i, the following simplifications can be taken. Firstly, saturated queues are separated from the scheduler. The linkrate of the reduced system is $$\frac{w_i}{w_i + \sum_{j \in S^c} w_j} C,$$

which is an upper bound to the service rate of queue i. Secondly, it can be assumed that $$\frac{w_i}{w_i + \sum_{j \in S^c} w_j}$$

share of bandwidth needs of non-saturated queues are ensured from the reduced system. Accordingly, the arrival processes of non-saturated queues are directed into the reduced system, but size of the packets is reduced to $$\frac{w_i}{w_i + \sum_{j \in S^c} w_j}$$

proportion of the original size. Thirdly, the packet service order is realized in the original system depends on the weight settings and on the actual FQ implementation. To give a worst-case approximation, it can be assumed that packets in the non-saturated queues are served as if they had higher priority than packets in queue i. As a result, the reduced system works as a Strict Priority scheduler, therefore this model can be called as a Separated Strict Priority model.

Figure 6:
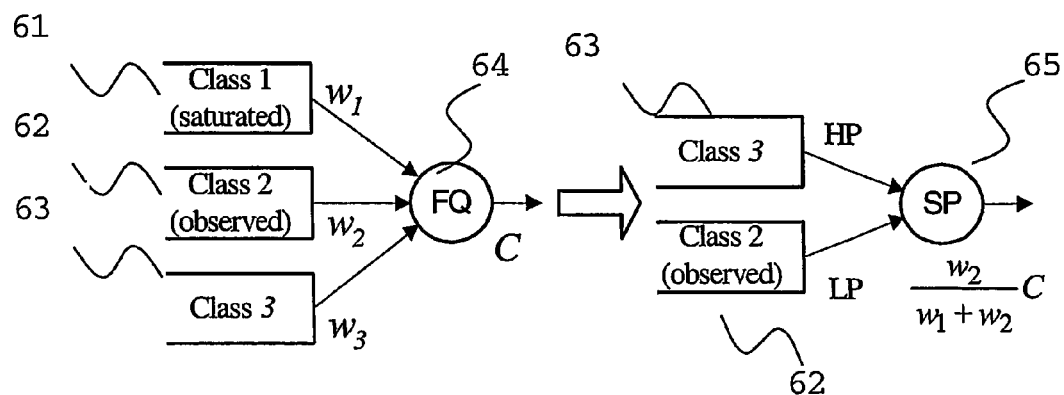
FIG. 6 is a schematic diagram of the Separated Strict Priority model derivation.

FIG. 6 shows the model in case of a three queue 61, 62, 63 system where the observed queue is queue 62 and queue 61 is saturated ($S^c=\{1\}$). The Separated SP model 65 gives a good approximation of the service rate of queue i if the utilization of the non-saturated queues (except queue i) is low. Nevertheless, it is conservative approximation at any traffic mixes. Therefore, queuing delay of queue i packets in the model is an upper bound for the queuing delay in the original system. Depending on which real-time (RT) queues are saturated, $2^{L-1}$ different models can be devised, where L is the number of RT queues. Different models give the best approximation for different traffic conditions. The Separated FIFO model is a special case of this model where each queue but i is saturated.

Note, that traffic in the best effort (BE) queues are not controlled, hence BE queues are considered to be always saturated.

By using the Separated SP models 65, the approximation problem of delay constraint surface in the FQ system 64 was simplified to the problem of approximating the delay constraint surface of low priority (LP) classes in multi-class strict priority systems. Although the detailed analysis of strict priority systems is beyond the scope of this invention, a simple method can be given for the approximation. Via simulations can be shown that in a two-class SP scheduler with periodic input the delay constraint curve of the LP class is close to linear and it is convex if packets are segmented. The linear approximation can be extended to multi-class strict priority systems. Although no analytic result is known which describes the whole constraint surface, but our simulation results on a wide range of parameters at two- and three-class cases indicate that the delay constraint surface of a LP class can be approximated by a single hyperplane, and this approximation is conservative.

Denote S the index set of queues and $K^s$ the number of classes in the SP system. An approximation hyperplane is given in the space of number of sessions, if $K^s$ points of the hyperplane are known. Therefore, the points of the approximation hyperplane of LP class i can be determined where only a single class i session is in the system and all other classes but j is empty (no ongoing sessions are present from other classes). Accordingly, $P_{ji}^s$ is defined as the maximal number of class j sessions in the SP system if delay requirement of a single class i session should be kept and all other classes are empty.

The complementary distribution function of queuing delay seen by a class i packet arriving at a random time instance in the SP system fed by number of $n_j$ class-j sources is denoted by $D_C^{n_j}(t)$. Considering the on-off behaviour of class-j traffic, the maximal number of class-j sources with respect to the delay requirements in class-i is $$P_{ji}^S = \max\left\{ N_j \left| \sum_{n_j=0}^{N_j} D_C^{n_j}\left(d_i - \frac{b_i}{C}\right) \cdot \Pi(n_j) < \varepsilon \right.\right\} \quad (1)$$

where $\pi(n)$ is the probability that n from the N class j sessions are active, C is the link capacity and $\epsilon$ is the tolerance level of QoS violation. We can distinguish two cases depending on whether class i and j is served in the same queue or not.

Firstly, if class i and class j is served in the same queue, this corresponds to a two class FIFO system. Then the queuing delay seen by a class i packet can be expressed by the steady-state virtual waiting time distribution of the FIFO queue. Formulas for virtual waiting time distribution in a FIFO-queue fed by periodic sources are well-known. Thus, $P_{ji}^S$ can be determined iteratively from (1) or directly by using approximations.

Secondly, the case is considered when class i and j served in different queues, that is, class j packets have priority over class i packets. The equation of an approximating hyperplane of the delay constraint of class i then can be written as $$\sum_{j \in S} E_{ji}^S \cdot N_j = P_{ii}^S + 1 \quad (2)$$

where $E_{ji}^S = P_{ii}^S / P_{ji}^S$. In the special case, when no session from class j can be admitted without violating QoS requirements of class i, that is, $P_{ji}^S = 0$, we set $E_{ji}^S = P_{ii}^S + 2$ to avoid division by zero. This guarantees that the corresponding hyperplane remains conservative.

As it was seen in the previous subsections that $2^{L-1}$ different Separated SP models can be constructed for a FQ system with L real-time queues, which conservatively approximate the service rate of a class. Accordingly, $2^{L-1}$ different hyperplanes can be determined, and all of them conservatively approximate the delay constraint surface of that class in the original system. We use the linear approximation of the delay constraint surface to check whether delay requirements of a given class will be kept if the traffic mix is admitted. If the traffic mix is below at least one of the approximating hyperplanes in the space of number of sessions, then the specific delay constraint is fulfilled. This is tested by checking $$\max_S \left( P_{ii}^S + 1 - \sum_{j \in S} E_{ji}^S \cdot N_j \right) > 0 \tag{3}$$

This test should be run for each real-time class. Therefore, the computational complexity of the real-time phase is $O(K^2 \cdot 2^{L-1})$ if the number of real-time classes is K and that of real-time queues is L. However, the complexity of initialization and real-time phase can be decreased if not all of the approximating hyperplanes are determined. The relevant hyperplanes, which are the ones that admit the most connections at frequent traffic mixes, should only be determined. Queues that usually contain many connections can be taken as saturated and queues with few connections as non-saturated, which gives only a single approximating hyperplane for delay constraint regions. If each delay constraint region is approximated with a single hyperplane, then the complexity of the real-time phase is $O(K^2)$, which is the same as with the Separated FIFO model. Note that at least one hyperplane is necessary for each delay constraint to ensure correct operation.

Figure 7:
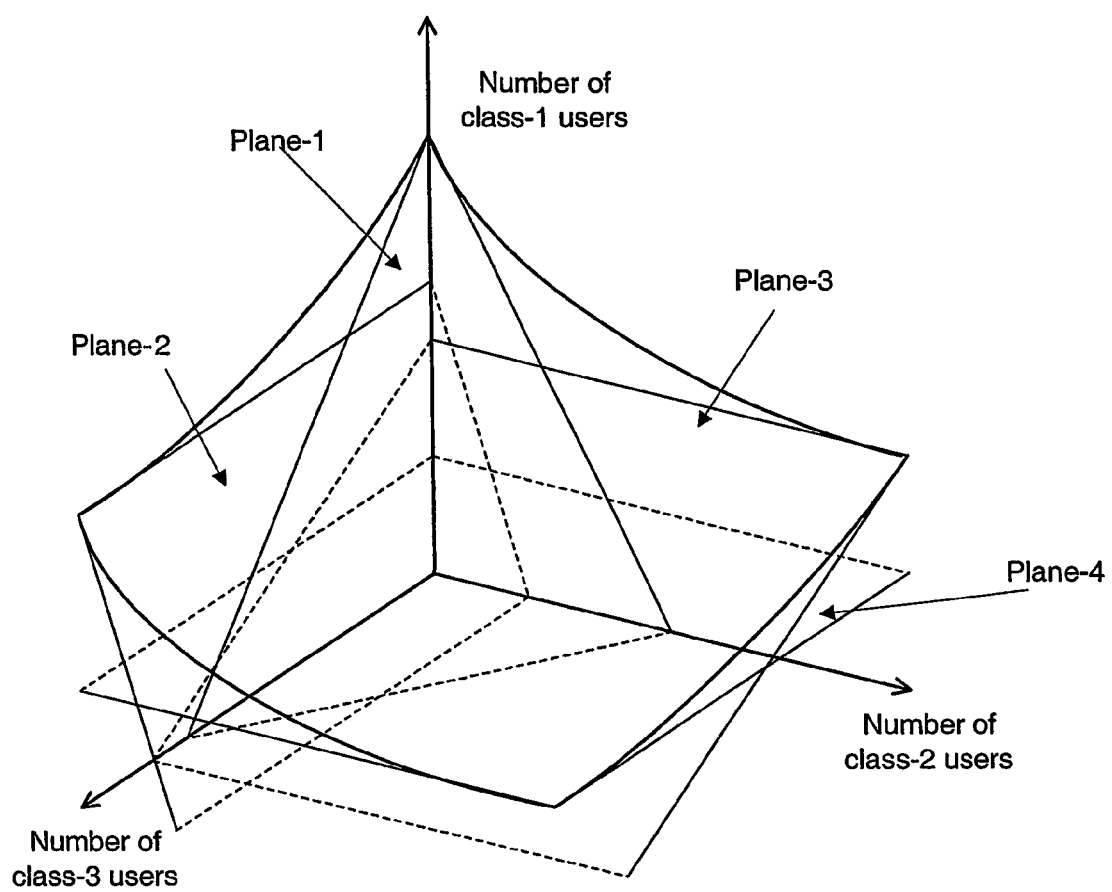
FIG. 7 is a graph of hyperplanes of class −1 delay constraint surface for a three-class case.

FIG. 7 demonstrates the linear approximation of the delay constraint surface of class 1 in a three-class system where each class has its own queue. Plane 1 belongs to the case when none of the queues is saturated. Plane 2 and Plane 3 correspond to the case when one of the queues is saturated and finally at Plane 4 both queue 2 and queue 3 are saturated. The approximation of the delay constraint region of class 1 can be obtained as the union of the regions bordered by the approximating surfaces.

Besides short time-scale bursts, delay violation caused by overload should be also avoided. A queue is considered overloaded, if the mean input rate in that queue exceeds its mean service rate. The ratio of lost packets, which is a part of the QoS measure, expresses the probability that a packet arrives in an overloaded situation. Direct calculation of the loss ratio is a computationally complex task if the number of sessions is large, hence an approximation is provided.

One of the traffic descriptor in each class is the activity level $\alpha_i$, which is the ratio of mean rate and the peak rate of a session. Thus, the number of active sessions from the $N=(N_1, N_2, \ldots, N_K)$ ongoing real-time sessions can be calculated using the multi-dimensional binomial distribution as $$\Pi(n) \prod_i \binom{N_i}{n_i} \cdot (\alpha_i)^{n_i} \cdot (1 - \alpha_i)^{N_i - n_i} \tag{9}$$

If the mean input rate in a queue exceeds the mean service rate, then the buffer fills up quickly and new packets will be dropped or delayed, which results in violated QoS requirements. If delay requirements are small compared to the length of ON and OFF periods of a session then the buffer sizes are relatively small too. Therefore, we assume that all packets arriving in an overloaded queue are lost. The ratio of lost packets expresses the probability that a packet arrives in an overloaded situation. In case of Fair Queuing scheduler fed by on-off processes the loss ratio measure of class i served in queue k can be calculated as $$\frac{\sum_{R_k(n) > C_k(n)} n_i \cdot \Pi(n)}{\sum_{\forall n} n_i \cdot \Pi(n)} \tag{10}$$

where $R_i(n)$ is the input rate and $C_i(n)$ is the service rate of queue k if the number of active sources n is given. To provide the approximation, firstly, we use the lower bound on the service rate of queue k as $$C_k(n) \geq C_k'(n) = \kappa_k \left( C - \sum_{j \in RT_k} R_j(n) \right) \tag{11}$$

where $$\kappa_k = \frac{w_k}{w_k + \sum_{j \in BE} w_j},$$

and BE and $RT_k$ is the index set of BE queues and RT queues excluding k, respectively. Secondly, we use the fact that the number of active sessions in a class converges to the normal distribution if the number of sessions grows. Thus, the ratio of lost packets can be approximated as $$\frac{\int_{-\infty}^{\infty} \int_{-\infty}^{\infty} K \int_{\kappa_k (C - \sum_{j \neq 1} x_j)}^{\infty} x_k \varphi_1(x_1) \varphi_2(x_2) K \varphi_K(x_K) dx_k dx_1 K dx_K}{\int_{-\infty}^{\infty} \int_{-\infty}^{\infty} K \int_{-\infty}^{\infty} x_k \varphi_1(x_1) \varphi_2(x_2) K \varphi_K(x_K) dx_k dx_1 K dx_K} \tag{12}$$

where $\phi_k(x) = \phi(x, r_k, v_k)$ is the density function of the normal distribution with mean $r_k = \sum_{j \in Q_k} N_j \rho_j \alpha_j$ and variance $v_k = \sum_{j \in Q_k} N_j \rho_j^2 \alpha_j (1 - \alpha_j)$, where $Q_k$ is the index set of classes that are served in queue k, and $\rho_j$ is the mean input rate in class j. Reformulation of the approximation leads to closed form:

$$1 - \Phi(C, \tilde{R}_k, \tilde{V}_k) + \frac{\tilde{V}_k}{\tilde{R}_k} \cdot \varphi(C, \tilde{R}_k, \tilde{V}_k) \tag{13}$$

where $\tilde{R}_k = K_k^{-1} r_k + \Sigma_{j \neq k} r_j$ and $\tilde{V}_k = K_k^{-2} v_k + \Sigma_{j \neq k} v_j$ are the corrected mean and variance of input rate in queue k.

Figure 8:
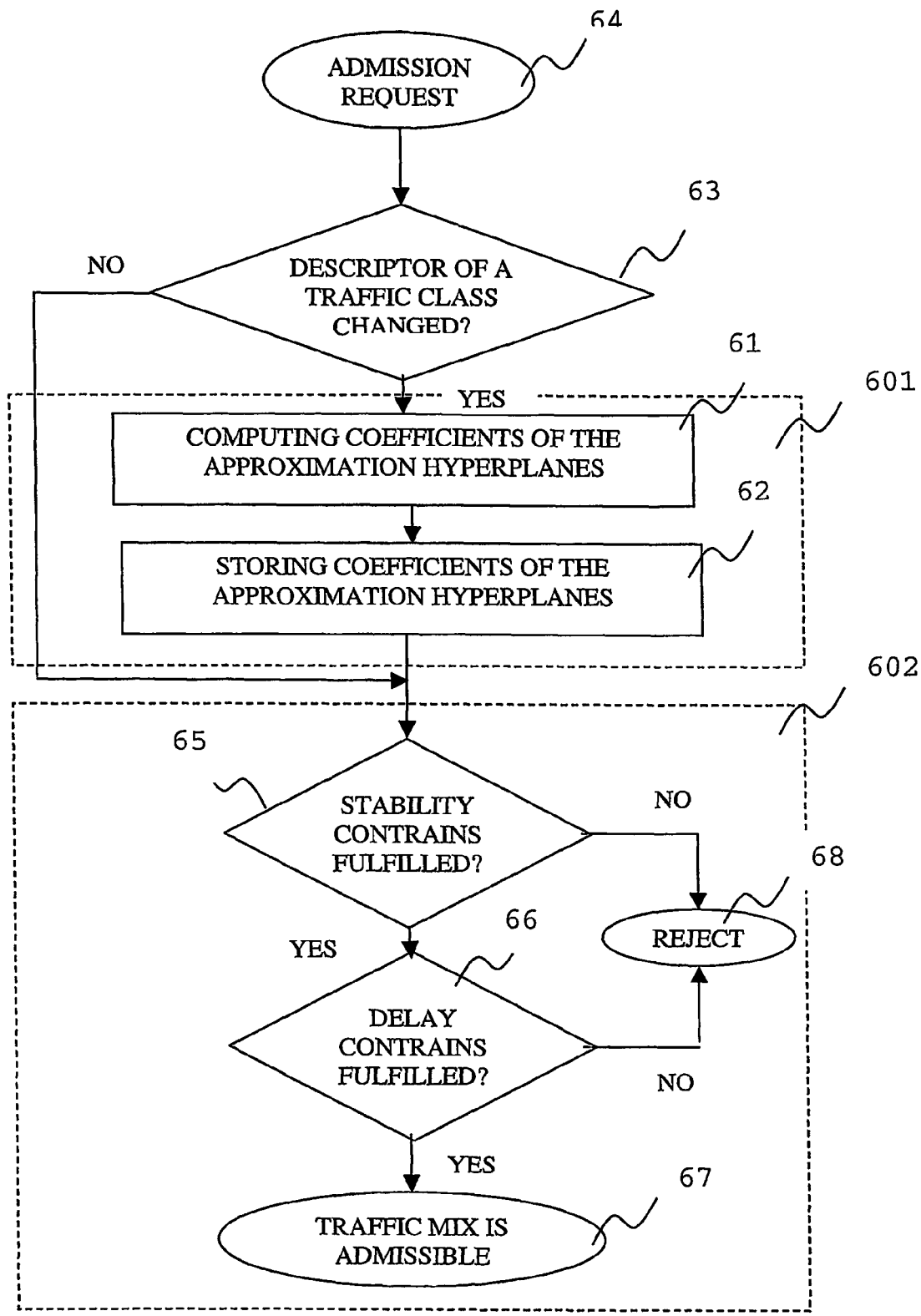
FIG. 8 is flow chart depicting the two phases of the admission control process.

In FIG. 8 the simplified flowchart of an exemplary call admission control method is shown. The method consist of an initialization phase 601 and a real-time phase 602. When an admission request 64 is invoked, prior to the initialization phase 601 a decision is made whether the descriptor of a traffic class changed 63. If yes, initialization phase 601 is invoked and in step 61 coefficients of the approximating hyperplanes are computed and in step 62 stored. This phase is repeated when the descriptor of a traffic class changes 63, which usually happens when nodes are configured or reconfigured, otherwise in the real-time phase 602 two decisions are made. A traffic mix is admissible 67, if for each real-time traffic class both the stability 65 and the delay constraints 66 are fulfilled. If not, the admission is rejected 68. In another implementation stability and delay check are performed simultaneously.

Initialization method waits the following input parameters:
link capacity C
number of real-time classes K
number of real-time queues in the FQ scheduler L
traffic descriptors of the real-time classes ($T_i$, $b_i$, $s_i$, $\alpha_i$ where
  $T_i$ is the Transmission Time Interval (TTI)
  $b_i$ is the packet size
  $s_i$ the size of the last segment (if no segmentation is applied for that class, then $s_i = b_i$)
  $\alpha_i$ is the activity level
QoS requirements of real-time classes ($d_i$, $\epsilon_i$), where
  $d_i$ is the delay requirement assigned to that node
  $\epsilon_i$ is the tolerance level against QoS violations
assigned DiffServ queue $D_i$ for each traffic class
weights $w_i$ assigned to the queues in the FQ scheduler As output, the initialization method provides the following arrays
H(i): the number of approximating hyperplanes for RT class i (1D array containing integer values, $H(i) \leq 2^{L-1}$)
E(M,j,i): effective bandwidth value for a class j session expressed in number of class i sessions in scheduling model M (3D array containing floating point values; $M \leq H(i)$ and $i, j \leq K$)
P(M,i): maximal number of class i sessions in scheduling model M if no ongoing sessions from other classes are present (2D array containing floating point values; $M \leq H(i)$ and $i \leq K$)
K(q): capacity share of real-time queue q if each other real-time queues are empty (1D array containing floating point values, $q \leq L$)

An exemplary pseudo code for the implementation of the initialization phase can be as follows:

```
1. For each real-time class i : H(i) := 0
2. For each real-time class i : call procedure
   SpModel(i,L, saturated)
3. For each real-time queue q: call procedure
   CapacityShare(q)
4. EXIT with H, E, P and κ
```

Procedure SpModel(i, j, Saturated)

```
1. If j = 0, then call Calculation(i, saturated).
   Then EXIT
2. If queue(j) is non-real-time, then saturated(j) :=
   true and call SpModel(i,j-1, saturated). Then
   EXIT.
3. Else if j = D_i, then saturated(j) := false, and
   call SpModel(i,j-1, saturated). Then EXIT
4. saturated(j) := TRUE and call SpModel(i,j-1,
   saturated)
5. saturated(j) := FALSE and call SpModel(i,j-
   1,saturated)
6. EXIT
```

Procedure Calculation(i, Saturated)

```
1. - r := w_i / (w_i + Σ_{j∈saturated} w_j)

2. c := C * r
3. P(H(i), i) := call FIFOmax(c, T_i, b_i, α_i, d
   _i - b_i/c, ε_i)
4. If P(H(i),i) = 0, then EXIT.
5. j := 1
6. If j = i then E(H(i),i,i) := 1
7. Else If saturated(D_j) then E(H(i),j,i) := 0
8. Else If D_j = D_i then
   x := call FIFOmax(c, T_j, b_j, α_j, d_i - b_i/c,
   ε_i)
   If x = 0 then E(H(i),j,i) := P(H(i),i) + 2
   Else E(H(i),j,i) := P(H(i),i)/x
9. Else
   x := call SPmax(c, T_j, b_j*r, α_j, b_i, s_i, d_i,
   ε_i)
   If x = 0 then E(H(i),j,i) := P(H(i),i)+2
   Else E(H(i),j,i) := P(H(i),i)/x
10. j := j +1
11. If j ≤ L then GOTO 6;
12. H(i) := H(i) + 1
13. EXIT
```

Function FIFOmax(c, T, b, α, d, ε)

```
1. N := 1

2. r := Σ_{n=0}^{N} Q_{T,c}^n(d) · Π(n), where

Q_{T,c}^n(x) is defined below

Π(n) = (N choose n) · (α)^n · (1 − α)^{N−n}

3. If r > ε then RETURN N−1;
4. N := N + 1
5. GOTO 2;
```

Function SPmax(c, T, $b_H$, $\alpha_H$, $b_L$, $S_L$, $d_L$, $\epsilon_L$)

```
1. N := 1

2. r := Σ_{n=0}^{N} D_{T,c}^n(d) · Π(n), where
```

-continued $D_{T,c}^n(x)$ is defined below $$\Pi(n) = \binom{N}{n} \cdot (\alpha)^n \cdot (1-\alpha)^{N-n}$$

3. If $r > \epsilon_L$ then RETURN N−1;
4. N := N + 1
5. GOTO 2;

Procedure CapacityShare(q)

1. $\kappa_q = \dfrac{w_q}{w_q + \sum\limits_{j \in BE} w_j}$, where

BE is the set if best effort (non-real-time) queues
2. EXIT

It should be noted that pseudo-code above recalculates each element in the output arrays. However, during normal operation only elements assigned to new classes should be computed. In function FIFOmax, probability of violating delay requirements can be calculated using approximations instead of direct calculation.

The superposition of N independent periodic sources with the same period T in a FIFO buffer, i.e. having a single QoS class, has already been studied in a number of contributions before. The exact closed form solution for complementary distribution function of the virtual waiting time is known was as:

$$Q_{T,C}^N(x) = \sum_{i=\lceil \frac{xC}{b} \rceil}^{N} \binom{N}{i}\left(\frac{ib}{CT} - \frac{x}{T}\right)^i \left(1 - \frac{ib}{CT} + \frac{x}{T}\right)^{N-i-1}\left(1 - \frac{Nb}{CT} + \frac{x}{T}\right), \quad (5)$$

where N is the number of sources, T is the period length, C is the server capacity, b is the packet size, and $\lceil . \rceil$ denotes the upper integer value.

Expression (5) can be easily extended to multiple traffic classes that are heterogeneous in packet size, however, extension to heterogeneous period length requires approximations.

Despite the simplicity of (5), the maximal number of schedulable users for a given delay-loss constraint cannot be expressed from the formulae in closed form. There are a simple and invertable approximation for the distribution of the virtual waiting time based on the Brownian bridge approximation. The complementary distribution function of the virtual waiting time according to the Brownian bridge approximation for multiple classes is:

$$Q_{T,C}^{N_1,N_2,\ldots,N_k}(x) \approx \exp\left\{-\frac{2xC}{\sum_i N_i b_i^2} \cdot \left((x+T)C - \sum_i N_i b_i\right)\right\}, \quad (6)$$

where the new notations are: k—the number of traffic classes, $N_i$—the number of sources in class i and $b_i$—the packet size in class i. The distribution of the queuing delay is expressed by (5) and (6), thus the statistical delay requirement for a class j packet is met if the following inequality is fulfilled:

$$Q_{T,C}^{N_1,\ldots,N_j-1,\ldots,N_k}(d_j) \leq \epsilon_j \quad (7)$$

where $d_j$ is the maximum queuing delay of a class j packet and $\epsilon_j$ is the tolerated delay violation probability for class j.

Search method in functions FIFOmax and SPmax can be much more effective than one in the pseudo-code above (e.g. binary search).

The principles derived for FIFO scheduling can be extended to Strict Priority (SP) scheduling. In this model, independent periodic sources are grouped into traffic classes according to their traffic parameters. Each traffic class has its own queue in the investigated scheduling architecture, and a strict priority order is given for the queues.

For the distribution of the queuing delay was shown that in a non-preemptive strict priority system that includes one low priority periodic source with period length T, packet size $b_L$, N high priority sources with period length T and packet size $b_H$, the complementary distribution function of the delay between the arrival of the low priority packet and the beginning of its service is $$Q_{T,C}^N(x) = \sum_{n=\lceil \frac{xC}{b_H} \rceil}^{N} \binom{N}{n}(\rho_n)^{n-1}(1-\rho_n)^{N-n-1}(1-\rho)\left(\rho_n - \frac{x}{T}\right), \quad (8)$$

where $\rho_n = \dfrac{nb_H}{CT}$ and $\rho = \dfrac{Nb_H}{CT}$.

Figure 9:
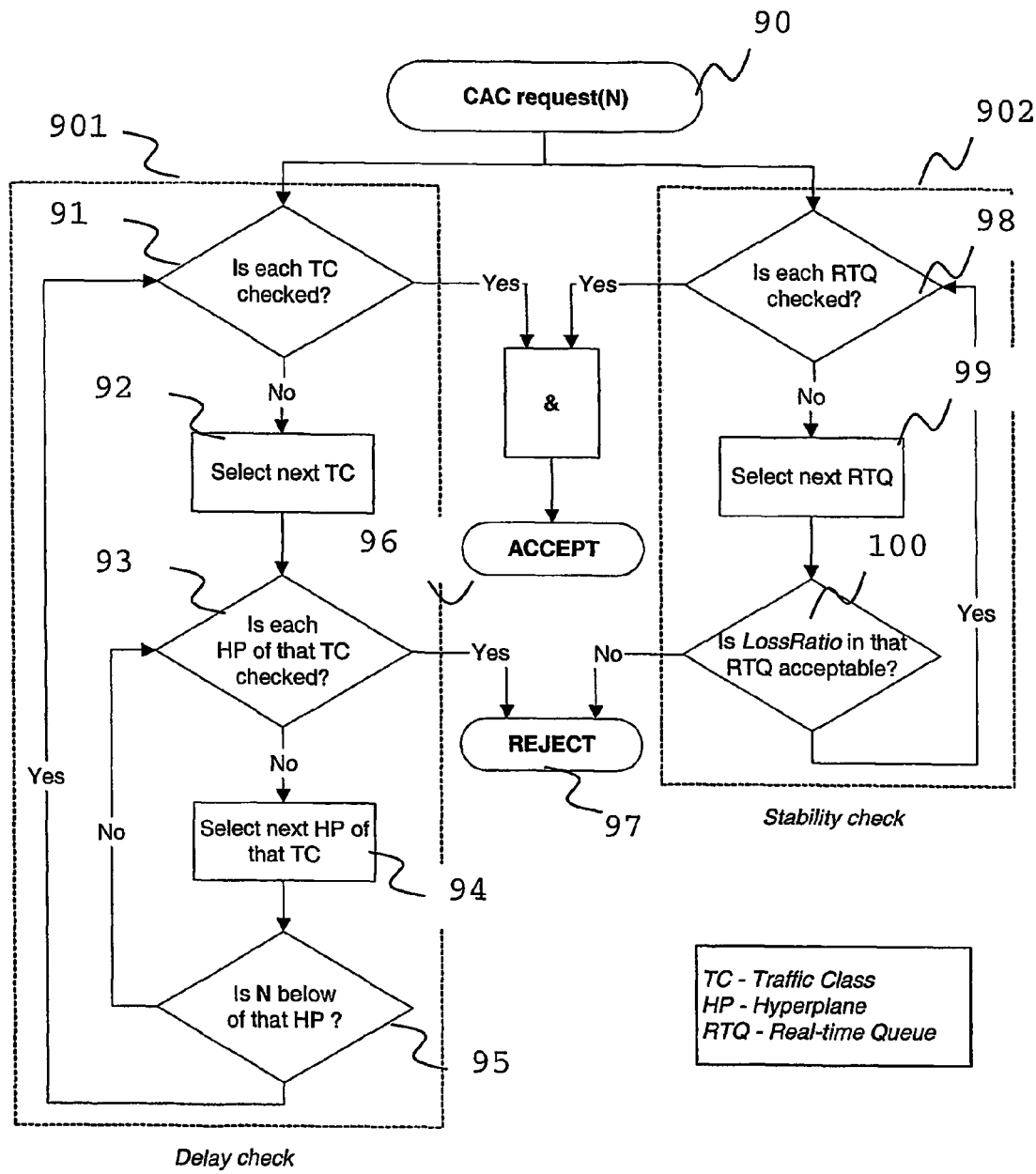
FIG. 9 is an exemplary flowchart of the real-time phase of the admission control process.

In FIG. 9 an exemplary embodiment of the real-time phase is illustrated. As it is seen stability 902 and delay 901 can be checked parallel when a CAC request 90 is invoked. During stability check 902, stability of each real-time queue is tested, by estimating the loss ratio by the LossRatio(N,q) function and comparing the minimal allowed tolerance level in that queue. In the step 98 it is determined whether each real-time queue (RTQ) is checked 98. If is not, the next RTQ is selected 99. In step 100 it is determined that LossRation in that RTQ is acceptable. If is not, traffic mix is rejected 97.

Delay check 901 is done by using the proposed linear approximation method for each real-time traffic class. A traffic mix fulfills the delay requirement of a class, if it is below at least one approximating hyperplane in the space of number of sessions. This is tested by comparing the scalar product of the traffic mix vector and the normal vector of the hyperplane to P(s,i). Delay check 901 is successful, if at least one appropriate hyperplane is found for each class. In step 91 it is determined that each traffic class is checked. If is not, next traffic class is selected. In step 93 it is determined that each hyperplane of that traffic class is checked. If is not, then it is determined 95 whether N is below of that hyperplane.

Traffic mix is accepted 96, if both stability check for each real-time queue and delay check for each real-time class are successful otherwise traffic mix is rejected 97.

As an exemplary implementation can be as follows:

Scalar product $E*N^T$ (i,s,N)

1. x := 0; j := 1
2. x := x + N(j)*E(s,j.i)
3. j := j+1
4. If j ≤ K then GOTO 2
5. Return x;

Function LossRatio(N,q)

---

1. $R := 0, V := 0$
2. For each real-time class i $r := N_i \alpha_i \frac{b_i}{T_i}; \quad v := N_i \alpha_i (1 - \alpha_i) \frac{b_i^2}{T_i^2}$ If $D_i = q$ then
    $R = R + r/\kappa(q); V = V + v/(\kappa(q))^2;$
    Else
    $R = R + r; V = V + v;$
3. If $V = 0$ Then
    If $R > C$ Then Return 1
    Else Return 0
4. Else
    Return $1 - \Phi(C, R, V) + V/R * \phi(C, R, V)$

---

The symbols $\phi(x,\mu,\sigma^2)$ and $\Phi(x,\mu,\sigma^2)$ refers to the density and cumulative distribution functions of the normal distribution with mean $\mu$ and variance $\sigma^2$.

Efficiency of the CAC method can be improved by adjusting the sequence of checking stability of queues, and sequence of checking the delay requirements of classes, as well as the sequence of hyperplanes to which the traffic mix is compared. Adjustment can be done by configuration (e.g. based on call level parameters of the load) or by applying an LRU (Last Recently Used) sorting.

Although several embodiments of the present invention have been illustrated in the accompanying Drawings and described in the foregoing Detailed Description, it is understood that the invention is not limited to the embodiments disclosed, but is capable of numerous rearrangements, modifications, and substitutions without departing from the scope of the invention as set forth and defined by the following claims.

What is claimed is:

1. A call admission control method in a node of an Internet Protocol (IP) Differentiated Services (DiffServ) network for controlling admission of a traffic mix relating to a number of different traffic classes of which at least one is a real-time traffic class, comprising the steps of:
    determining whether a descriptor of a traffic class has changed;
    invoking an initialization phase if said descriptor of a traffic class has changed, said initialization phase comprising computing coefficients of approximating hyperplanes of delay constraints of at least one traffic class;
    storing the coefficients of said approximating hyperplanes; and,
    performing a real-time phase comprising the steps of:
        determining whether a stability constraint is fulfilled;
        determining whether a delay constraint is fulfilled;
        admitting a traffic mix if, for each real-time traffic class, both the stability and the delay constraints are fulfilled; and,
        rejecting a traffic mix if, for each real-time traffic class, either the stability or the delay constraints are not fulfilled.

2. The call admission control method of claim 1, wherein said network is a Universal Mobile Telecommunication System Terrestrial Radio Access Networks (UTRAN) comprising at least one base station and a Radio Network Controller (RNC).

3. The call admission control method of claim 1, wherein the steps of said initialization phase are repeated if said descriptor of a traffic class changes.

4. The call admission control method of claim 1, wherein the steps of determining the stability constraint and the step of determining the delay constraint are performed simultaneously.

5. The call admission control method of claim 1, wherein the steps of computing the coefficients of approximating hyperplanes comprises the steps of calculating the arrays of:
    the number of approximating hyperplanes for each real-time class i;
    the effective bandwidth value for each class j session expressed in number of each class i sessions in scheduling model M;
    the maximal number of each class i sessions in scheduling model M if no ongoing sessions from other classes are present; and,
    the capacity share of each real-time queue q if each other real-time queues are empty.

6. The call admission control method of claim 1, wherein the step of determining whether said stability constraint is fulfilled includes evaluating the number of lost packets and comparing it to the tolerated packet loss ratio for each class in that queue.

7. The call admission control method of claim 1, wherein the step of determining whether said delay constraint is fulfilled includes checking if the traffic mix is below at least one of the approximating hyperplanes in the space of number of sessions for each class.

8. The call admission control method of claim 1, wherein the step of determining whether said delay constraint is fulfilled comprises the steps of:
    determining whether each traffic class is checked;
    selecting the next traffic class if not each of traffic class is checked;
    determining whether each hyperplane of that traffic class is checked;
    selecting next hyperplane if not each of hyperplanes of that traffic class is checked; and,
    determining whether N is below of that hyperplane, where N is a vector defining the number of sessions is each traffic class.

* * * * *